United States Patent [19]

Schäfer et al.

[11] 4,369,042

[45] Jan. 18, 1983

[54] FUEL BRIQUETS

[75] Inventors: Hans G. Schäfer, Aachen; Axel Vogts, Eschweiler; Günter Poppel, Düren-Niederau; Horst Schürmann, Düren, all of Fed. Rep. of Germany

[73] Assignee: Akzo NV, Arnhem, Netherlands

[21] Appl. No.: 289,527

[22] Filed: Aug. 3, 1981

[30] Foreign Application Priority Data

Aug. 22, 1980 [DE] Fed. Rep. of Germany ....... 3031630

[51] Int. Cl.$^3$ ................................................ C10L 5/10
[52] U.S. Cl. ...................................... 44/15 R; 44/23; 44/25
[58] Field of Search ................... 44/15 R, 10 C, 10 D, 44/23, 25

[56] References Cited

FOREIGN PATENT DOCUMENTS 758386 4/1971 France ..................................... 44/25
650671 2/1951 United Kingdom .
822495 10/1959 United Kingdom ............... 44/15 R

*Primary Examiner*—Charles F. Warren
*Assistant Examiner*—Margaret B. Medley
*Attorney, Agent, or Firm*—Michael J. Striker

[57] ABSTRACT

Fuel briquets containing binding agents and additives are obtained by briquetting of approximately 80 to 99% by weight of an essentially solid fuel, approximately 0.1 to 19% by weight of a natural or synthetic binding agent and approximately 0.1 to 10% by weight, calculated on a dry basis, of a cationic resin obtained by reacting polyamines with halohydrin.

13 Claims, No Drawings

FUEL BRIQUETS

The invention relates to briquets on the basis of fuels such as hard coal, coke, brown coal, charcoal, etc., obtained by briquetting in the presence of a binding agent and by use of a further additive, wherein, however, the binding agent may already be present by nature, as is the case with many types of brown coal, or will be admixed in addition to the further additive.

It is known how to produce, by compressing, briquets from respectively, pulverized material or such with fine or coarse granules. In shaping by briquetting, a difference is made between binderless methods and briquetting with the addition of organic or inorganic binding agents.

Addition of a binding agent is intended to obtain improved briquetting characteristics of the compressing stock during briquetting, f.i. to bring about better plasticity during the shaping process, but on the other hand, the binding agent should also raise the cohesion of the briquetted material so that better handling of the briquets will be possible. An added binding agent should, above all, also impart a favorable effect to such properties of the briquets as strength, stability in burning, high thermal efficiency in combustion, smoke control, etc.

Numerous binding agents have already become known, which are used in briquetting coke, anthracite, semibituminous and gas coals etc. The briquets known hitherto, and the processes for their production are, however, of disadvantage in many respects. Using, f.i., pitch or asphalt-derived bitumen as binding agent will produce briquets which, will generate heavy smoke upon combustion, and, due to melting of the binding agent will disintegrate too fast. This will also, inter alia, result in the available material not being utilized fully during combustion and by great quantities of uncombusted carbon being provable in the ashes. It may thus occur that up to approximately 60% of the carbon will yet remain in the ashes and will then be lost as waste, or require a cumbersome process for its recuperation.

Hard-coal tar pitch as binding agent is of disadvantage as it may possibly contain carcinogenous substances; its use should therefore be avoided as far as possible. Use of pitch as binding agent in briquets intended for domestic heating is therefore prohibited on environmental grounds.

Beyond the aforegoing, there are a number of brown coals which are readily briquettable without additionally requiring a binding agent, since these brown coals contain by nature ca. 5 to 10% organic constituents which are effective as binding agents. The mechanical properties of such briquets are, however, inadequate for special applications, and difficulties will particularly arise when using such brown coal briquets for coking.

In DE allowed application No. 1 186 825, sulfite waste liquor obtained in cellulose production is recommended as binding agent, but it must be processed with the coal by a special method. Apart from the binding agent itself, 0.1% to 1% of an oil may be admixed to the briquetting stock as further additive.

Although a considerable range of briquets containing, apart from fuel, also binding agents, has become known, as have corresponding processes for their manufacture, the need still exists for improved processes to produce briquets from fuels such as coal, coke, charcoal, brown coal etc., and also for briquets of the aforegoing type having improved properties.

It is therefore the object of the invention, to make available briquets produced from fuels in the presence of binding agents, said briquets being reduced in their smoke, allowing good handling, without thereby causing noteworthy breakage or formation of dust or fines, and possessing good cold strength and a particularly high stability on burning. A further object of the invention are fuel briquets distinguished by highly efficient combustion and yielding an ash containing no, or only negligible, quantities of uncombusted constituents, allowing good coking and resulting in a coke of outstanding mechanical properties, suitable for manifold applications.

It is a still further object of the invention to make available an advantageous process allowing with simple briquetting techniques the production of improved, binding-agent containing briquets, such process being applicable to the processing of practically all essentially solid fuels, particularly flaming coal, gas coal, semibituminous coal, forge coal, anthracite, coke, brown coal, charcoal, etc, said process furthermore allowing the use of the most different binding agents and also being implementable on customary briquetting apparatus.

This object is attained by fuel briquets containing binding agents and additives, and obtained by briquetting of approximately 80 to 99% by weight of an essentially solid fuel, approximately 0.1 to 19% by weight of a natural or synthetic binding agent and approximately 0.1 to 10% by weight, calculated as dry substance, of a cationic resin obtained by reacting of polyamines with halohydrin.

The cationic resin will preferably be a product, prepared by reacting with halohydrin of a polyamidoamine obtained by polycondensation of saturated aliphatic dicarboxylic acids having 3 to 10 carbon atoms and of polyvalent amines of the general formula $NH_2-(C_nH_{2n}NH)_xH$, wherein n and x denote integers in the value of minimum 2.

It will be suitable, if the cationic resin has been produced by reacting of a polyamidoamine with halohydrin, wherein a reaction as known per se will ensue at temperatures from 45°–100° C. between polyamidoamines—obtained at a mol ratio to dicarboxylic acids from 0.8:1 to 1.4:1 by polycondensation at temperatures from 110° to 250° C. of saturated aliphatic dicarboxylic acids with 3 to 10 carbon atoms and of polyvalent amines of general formula $NH_2-(C_nH_{2n}NH)_xH$, wherein n and x denote integers of a value of minimum 2—and the halohydrin.

It is very favorable if the cationic resin has been produced by reacting halohydrins with a composition of polyamines and polyamidoamines.

Highly suitable are cationic resins of the aforenoted type, having simultaneously the property of increasing the wet strength of paper. It will be favorable if the reaction for obtaining the cationic resin is performed in an aqueous solution, epichlorohydrin being particularly suitable herein as halohydrin.

It is particularly charcoal and brown coals which are suitable as solid fuel for the fuel briquets. Use may also be made of a brown coal already containing by nature approximately 5–10% by weight of a natural constituent as binding agent. Furthermore, it is particularly binding agents on basis of bitumen which are suitable above all.

For producing such fuel briquets, use may be made of a process characterized by the commingling and forming into briquets in the manner known per se, 80 to 99% by weight of a comminuted essentially solid fuel, approximately 0.1 to 19% by weight of a natural or synthetic binding agent and 0.1 to 10% by weight of a cationic resin obtained by reacting a polyamine and a halohydrin.

It is appropriate, if the comminuted fuel, the binding agent and the cationic resin are commingled in cold state.

The fuel briquets as per invention are very well suitable for coking.

Cationic resins, as used per invention in the composition of the fuel briquets have been known per se for a longer period. They may be obtained for instance by the reaction of halohydrins with alkylene diamines such as ethylene diamine or 1, 3, propylene diamine, but also by the reaction of halohydrins with polyalkylene polyamines such as diethylene, triamine, triethylene, tetramine or tetraethylene pentamine. Cationic resins of this type are, f.i., described in U.S. Pat. No. 2,595,935.

Polyamines obtained by polycondensation of saturated aliphatic dicarboxylic acids and polyalkylene, polyamines should also be included in the polyamines that may be used in the composition of the cationic resin applied herein as per invention. Such polyamines will, apart from the amine function, also include amide functions. Polyamidoamines of this type and their reaction with a halohydrin, i.e. epichlorohydrin, are described in DE Letters Patent No. 1 177 824.

Particular reference is made herein to the disclosure regarding production of cationic resins effected in both the aforenoted Letters Patents.

Halohydrins are known derivatives of glycerin; in concatenation with the present invention, particular note is to be made of chlorohydrins which are very reactive. Apart from monochlorohydrins, dichlorohydrins may also be used. Particularly suitable within the framework of the invention is epichlorohydrin.

The cationic resins may be used as per invention as dry substance or, respectively, aqueous solution or dispersions of the most varied concentrations. All quantities noted in the invention relate to cationic resin calculated as dry substance.

Mixing of the comminuted, essentially solid, fuel, i.e. the fuel in the form of smaller particulates such as granules, breeze, dust, or similar, of the binding agent and the additive, may be performed in the manner as usual per se. The additive may be deposited on the briquetting stock, i.e. on a prepared mixture of fuel and binding agent, by spraying or through a nozzle. It is also practicable to commingle all three constituents simultaneously. It is particularly advantageous to perform mixing in cold state. Mixing may be performed in customary mixers, agitators or kneaders.

As per invention, the most different types of fuel materials can be used. Hard coal of any type is briquettable, such as flaming coal, gas and semibituminous coal, forge coal, anthracite, etc; brown coals of the most different origin are particularly suitable. Charcoal too, is very suitable within the scope of the invention.

It was particularly unexpected, that the invention would yield briquets very much reduced in smoke. Production of the briquets may be implemented with simple briquetting techniques and application of special processing techniques is not required. The briquetting stock may thus be molded on customary machines that may already be available. Suitable briquetting machines are, f.i., roll presses, ring roll presses, extruders, etc.

It is particularly noteworthy that the strengths of the obtained briquets are very good, so that handling of the briquets will present no difficulties and there will be a reduction in breakage and concomitant formation of fines and dust. Compressive strength is excellent. Particularly unexpected was the excellent stability in burning of the briquets as per invention.

It is not necessary to use great quantities of binding agents, in many instances it will even be possible to manage with smaller quantities than had been the case hitherto. It is thus possible, f.i. in briquetting hard coal, to reduce by several percent the content of added bitumen.

It is of further advantage that it is not required for the moisture content of the coals to be considerably reduced prior to briquetting. It is basically practicable to process briquets with a moisture content above 1.5%; in many instances, briquetting will be practicable even of coal having a considerable higher moisture content, i.e. up to 20%.

In coals, particularly those having a relatively high moisture content, such as brown coal that has been predried only to a small degree, f.i. to approximately 20% moisture, admixing the additive as per invention will also considerably increase wettability, so that the applied binding agent will more uniformly disperse on the coal particles. Addition of agents such as caustic lye or acids, frequently applied to increase wettability, will thus not be needed.

It was particularly unexpected that any type of coal may be processed as per this invention. It is possible herein to process a single type of coal by itself. Commingling of different types of coal will thus not be required any longer, as has frequently been the case hitherto, when, in order to obtain durable briquets, a second type of coal, such as f.i. gas coal, had to be added to coal types that would be difficult in briquetting.

No obnoxious odors will develop on combustion. Binding agents and additives are very well dispersable on the coals and undesirable agglomerations will not occur. Only short mixing periods are required. Processing of the additive is not dangerous.

It is practicable to process fine granulate as well as coarse granulate either separately or conjointly in a mixture. Use of coal dust is possible.

The resistance of the briquets to weathering is also satisfactory.

On combustion, and in other fields of application, the briquets will result in reduced quantities of slag. It is particularly unexpected that the briquets evidence a considerably higher degree of yield or, respectively, higher efficiency. The content of combustibles in material dropping through the grate on stoking is considerably reduced.

Briquets as per this invention are particularly suitable for use in coking, where the excellent mechanical properties will prove to be of benefit particularly at the high temperatures prevailing therein. The coke resulting from coking the briquets as per this invention has higher properties as to strength and is suitable for manifold applications.

The invention will be explained more closely by the following examples:

EXAMPLE 1

Production of a polyamidoamine

Added with stirring in a reaction vessel are 23.0 kg diethylene triamine (223 mol), 2.9 kg water and 35.7 kg adipic acid (244 mol). Slow heating (approximately 2.5 h) up to 190° C. is then made whereby 11.6 kg water are being distilled off. The acid number of the product should thereupon be 25 to 30 (mg KOH/g). Subsequent to cooling to approximately 130° C., dilution is made with 50 kg water. Resulting will be 100 kg of 50% polyamide solution (viscosity about 500 mPa·s at 20° C., amine number about 250).

EXAMPLE 2

Reacting with epichlorohydrin 16.8 kg of the polyamide solution as per Example 1 are diluted in a reaction vessel is 45.6 kg water. After heating to 40° C., 4.90 kg epichlorohydrin (1.4 mol per mol of basic nitrogen) are added during 15 minutes. Thereupon, the temperature is raised to 65° C. and the viscosity is continually checked during the ensuing reaction. Upon reaching of 80 to 100 mPa·s (measured at 65° C.), the reaction is interrupted by the addition of 2.7 kg acetic acid and 30.0 kg water. The yield is 100 kg of a 13% resin solution with a viscosity of 60 to 80 mPa·s and a pH value from 4.0 to 4.1.

EXAMPLE 3

Reacting of a polyamidoamine in composition with polyalkylene polyamines with epichlorohydrin 28.5 kg of a 50% polyamidoamine solution as per Example 1 are diluted with 52.5 kg water, and 1.7 kg diethylene triamine then added. After heating to 40° C., 14.3 kg epichlorohydrin are added, wherein the temperature will rise to 52° C. After renewed heating to 35° C., a stop is made at this temperature and condensation continued until a viscosity of 30 mPa·s. The reaction is then interrupted by the addition of 3 kg concentrated acetic acid. The yield will be a 30% solution of a viscosity from 40 to 45 mPa·s measured at 20° C.

EXAMPLE 4

Reacting a polyalkylene polyamine with epichlorohydrin 92 g epichlorohydrins are introduced during one hour into a solution from 34 g diethylene triamine and 126 g water which has been heated to 50° C. The solution is then heated further until the viscosity has reached 200 mPa·s. Thereupon, the solution is dilusted with concentrated hydrochloric acid and water, so that a solution of approximately 30% is obtained.

EXAMPLE 5

Briquetting of hard coal 93 parts of a fine-granulated composition of anthracite and forge coal (granulate size up to 3 mm) are commingled at room temperature in a mixer with 5 parts bitumen and 2 parts, calculated on basis of dry substance, of a cationic resin, used herein as aqueous solution of 13% by weight of a cationic resin as per Example 2. Thereupon, the composition is heated in a subsequently arranged kneader to approximately 130° C. The briquetting stock prepared in this manner is compressed in the usual manner on roll presses. The still warm briquets are then stored for about 30 minutes to cool and cure. The briquets produced in this manner will have a strength about 30% higher than briquets that have been obtained without addition of the cationic resin as per invention.

EXAMPLE 6

Briquetting of brown coal

Brown coal is dried to a moisture content of 17% and ground to a granulation from 0 to 6 mm. After addition of 3%, calculated on a dry basis, of a cationic resin as per Example 2, and after comingling and heating, this stock is shaped into briquets in a conventional extruder. After extruding, the briquets are stored for cooling for about 6 hours. The strengths of the brown coal briquets will be improved by up to 50% when compared to briquets that have been obtained without addition of the cationic resin as per invention.

EXAMPLE 7

Briquetting of charcoal

Charcoal is reduced by grinding to a granulation from 0 to 10%, as is customary with hard coal. Thereupon, 80 parts of charcoal, 18 parts bitumen and 2 parts, calculated as dry substance, of the cationic resin as per Example 2, are commingled and shaped on a roll press at temperatures of 130° C. into briquets. After pressing, the briquets will be stored for about ½ hour for cooling. The briquets will have improved strengths.

EXAMPLE 8

Briquetting of coke breeze 88 parts coke breeze, 10 parts bitumen and 2 parts, calculated as dry substance, of the cationic resin as per Example 2, are commingled and compressed on roll presses at temperatures of 130° C. into briquets. After cooling and storing, the briquets will have an improved strength compared to coke briquets that have been produced without addition of the cationic resin as per invention.

We claim:

1. Fuel briquets containing binding agents and additives, obtained by briquetting of approximately 80 to 99% by weight of an essentially solid fuel, approximately 0.1 to 19% by weight of a natural or synthetic binding agent and approximately 0.1 to 10% by weight, calculated on a dry basis, of a cationic resin obtained by reacting polyamines with halohydrin.

2. Fuel briquets as per claim 1, characterized by a cationic resin produced by reacting with halohydrin of a polyamidoamine obtained by polycondensation of saturated aliphatic dicarboxylic acids with 3 to 10 carbon atoms, and polyvalent amines of the general formula $NH_2-(C_nH_{2n}NH)_xH$, wherein n and x denote integers of a value of minimum 2.

3. Fuel briquets as per claim 2, characterized by a cationic resin, produced by reacting a polyamidoamine with halohydrin wherein a reaction as known per se will ensue at temperatures from 45°–100° C. between polyamidoamines—obtained at a mol ratio to dicarboxylic acids from 0.8:1 to 1.4:1 by polycondensation at temperatures from 110° to 250° C. of saturated aliphatic dicarboxylic acids with 3 to 10 carbon atoms and of polyvalent amines of general formula $NH_2-(C_nH_{2n}NH)_xH$, wherein n and x denote integers of a value of minimum 2—and the halohydrin.

4. Fuel briquets as per claim 3, characterized by a cationic resin obtained by the reaction of halohydrins with a composition of polyamines and polyamidoamines.

5. Fuel briquets as per claim 4, characterized by a cationic resin which also effects an increase in the wet strength of paper.

6. Fuel briquets as per claim 5, characterized by a cationic resin obtained by reacting in an aqueous solution.

7. Fuel briquets as per claim 6, characterized by a cationic resin obtained by reacting polyamines with epichlorohydrin.

8. Fuel briquets as per claim 7, characterized by approx. 80 to 99% by weight of charcoal.

9. Fuel briquets as per claim 7, characterized by approx. 80 to 99% by weight of brown coal.

10. Fuel briquets as per claim 9, characterized by a brown coal containing, already in its natural state, a proportion of approx. 5 to 10% of a natural constituent as binding agent.

11. Fuel briquets as per claim 9, characterized by a binding agent based on bitumen.

12. Process for producing fuel briquets containing binding agents and additives by commingling and forming into briquets in the manner known per se, of 80 to 99% by weight of a comminuted and essentially solid fuel, of 0.1 to 19% by weight of a natural or synthetic binding agent and of 0.1 to 10% by weight, calculated on a dry basis, of a cationic resin obtained by reacting a polyamine and a halohydrin.

13. Process as per claim 12, characterized by cold mixing of comminuted fuel, binding agent and cationic resin.

* * * * *